C. A. WELSBACHER & J. STAAB.
TROLLEY WHEEL SUPPORT.
APPLICATION FILED MAR. 6, 1911.
1,008,506.
Patented Nov. 14, 1911.
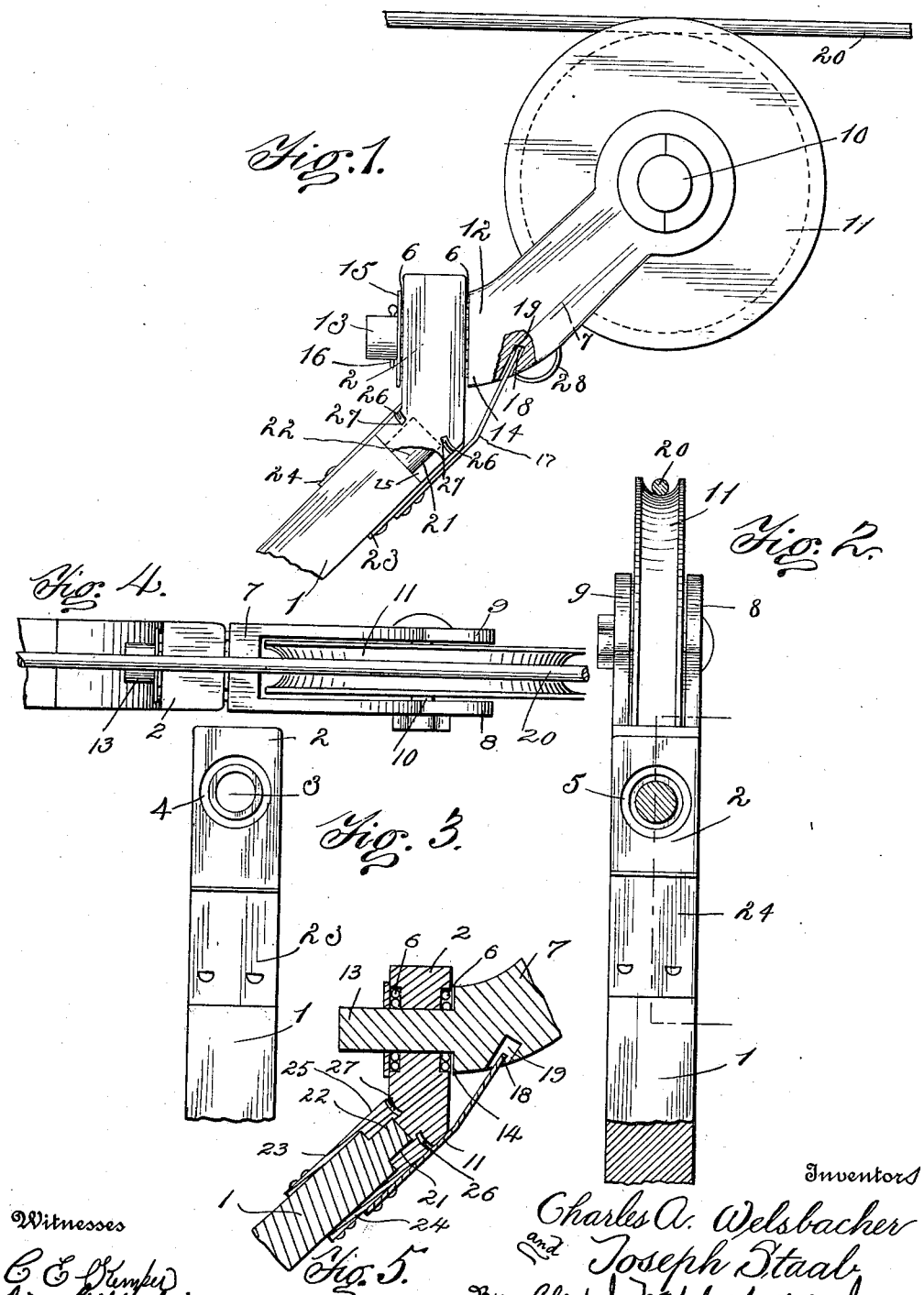

UNITED STATES PATENT OFFICE.

CHARLES A. WELSBACHER AND JOSEPH STAAB, OF PITTSBURGH, PENNSYLVANIA.

TROLLEY-WHEEL SUPPORT.

1,008,506.          Specification of Letters Patent.      Patented Nov. 14, 1911.

Application filed March 6, 1911. Serial No. 612,602.

*To all whom it may concern:*

Be it known that we, CHARLES A. WELSBACHER and JOSEPH STAAB, citizens of the United States, residing at Pittsburgh, in the county of Allegheny and State of Pennsylvania, have invented certain new and useful Improvements in Trolley-Wheel Supports, of which the following is a specification.

This invention relates to improvements in trolley wheel supports and has for its object to provide a combined trolley pole and harp so arranged that a trolley wheel may have free movement to follow a trolley wire regardless of the line of travel of the trolley pole.

With the above and other objects in view we have invented the device illustrated in the accompanying drawings in which, Figure 1 is a side elevation of a trolley wheel and its mounting, Fig. 2 is a front elevation of Fig. 1, Fig. 3 is a rear elevational view of an upper end of a trolley pole, Fig. 4 is a top plan view of Fig. 1, Fig. 5 is a fragmental vertical sectional view taken on line A—A of Fig. 2.

Referring to the accompanying drawings 1 is the upper part of a trolley pole, the lower part not being shown in any of the views; having its head 2 rotatably mounted thereon and bent in vertical relation thereto and having an opening 3 therethrough. Ball races 4 and 5 are formed around each end of said opening in which balls 6 are adapted to run.

The trolley harp 7 is provided with a bifurcated end forming two arms 8 and 9 which act as bearings for the shaft 10 upon which the trolley wheel 11 is mounted. The lower portion 12 of the harp is provided with a reduced spindle 13 which is horizontally disposed in relation to the upper portion of the harp and is adapted to rotate seat in the opening 3 of the pole head. The reducing of the spindle 13 forms a shoulder 14 on the harp, which is adapted to abut the balls on the race 4. A washer 15 is mounted on the spindle 13 and held in place by a cotter pin 16, this washer engages the balls in the race 5.

A spring 17 is secured to the pole at one end and has its free end 18 disposed in an opening 19 in the harp 7 whereby the wheel is held normally in a vertical position but may readily move out of that position when a curve in the trolley wire 20 happens to be in a line different from that being followed by the pole. The head 2 is provided with a socket 21 in which the reduced end 22 of the pole 1 seats. Springs 23 and 24 secured to the pole 1 project onto the neck 25 of the head 2 and are provided with lugs 26 which engage the slots 27 and thereby hold the head to the pole; the length of these slots determine the rotatable movement of said head on said pole. The slots 27 are so curved and of such a length that the head may have a rotary motion within a limited area.

28 is a rope eye.

We claim and desire to secure by Letters Patent:—

A trolley support consisting of a pole having a head rotatably mounted thereon, latch members on said pole, said head having slots therein adapted to be engaged by said latch members, said slots being long enough to permit of rotation of said head while engaged by said latch members, a trolley harp rotatably mounted on said head and means for holding said harp in a normally fixed position.

In testimony whereof we affix our signatures in presence of two witnesses.

CHARLES A. WELSBACHER.
JOSEPH STAAB.

Witnesses:
JNO. A. BLEICHNER,
WILLIAM J. STAAB.

Copies of this patent may be obtained for five cents each, by addressing the "Commissioner of Patents, Washington, D. C."